Jan. 21, 1969   H. G. SHAW   3,422,977
SAFETY DEVICE AND ASSEMBLY USING SAME
Filed March 17, 1967
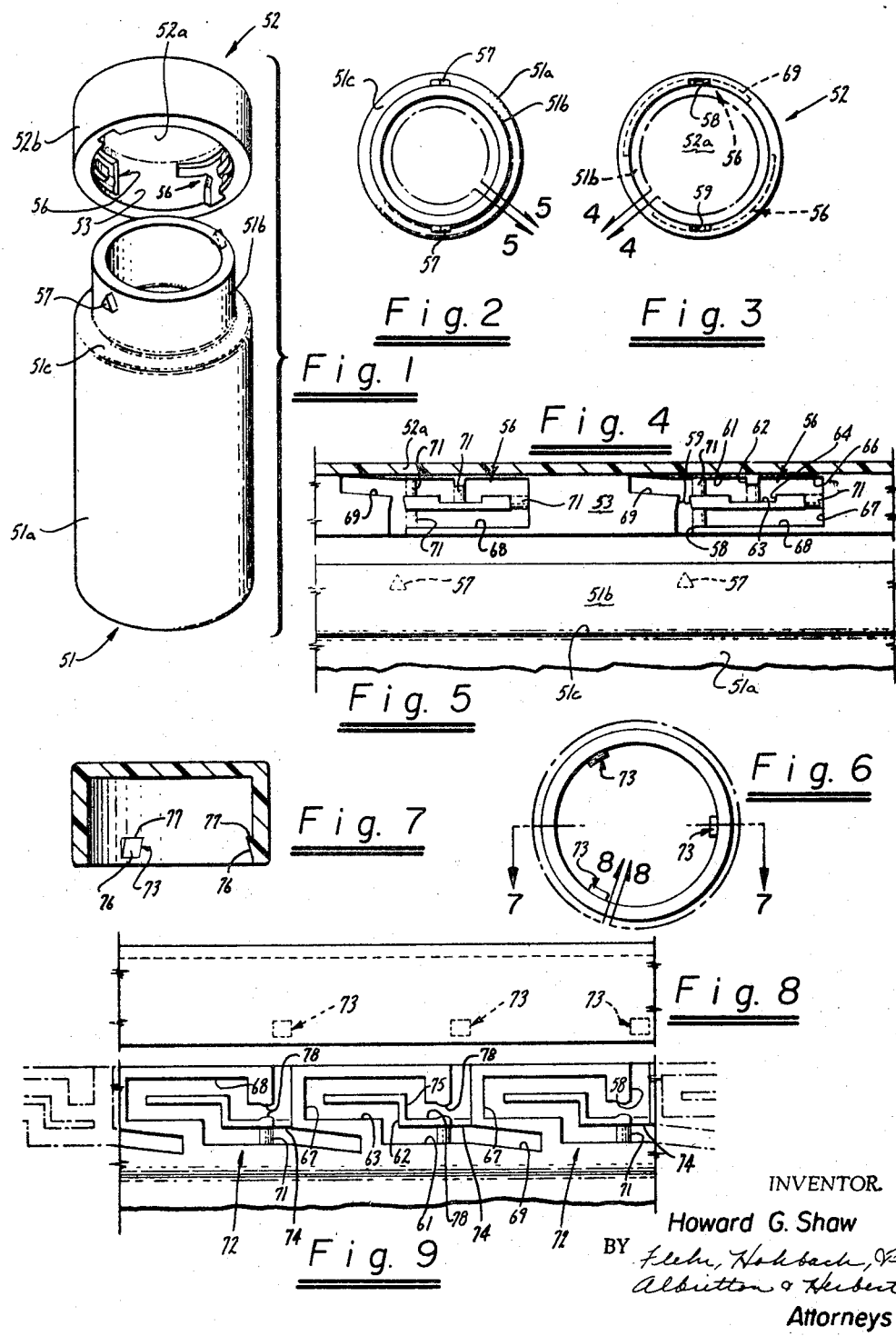
INVENTOR.
Howard G. Shaw
Attorneys

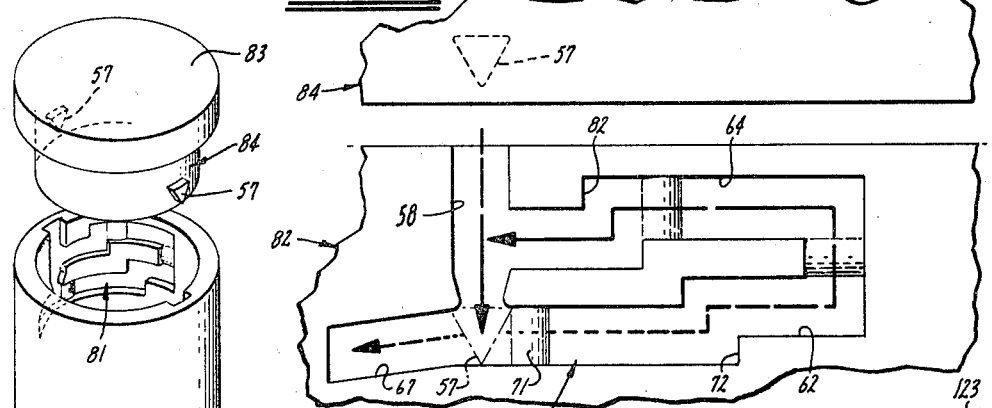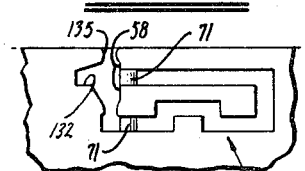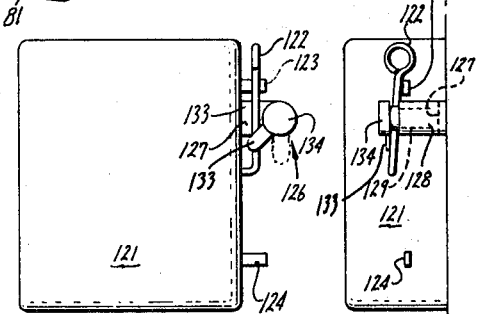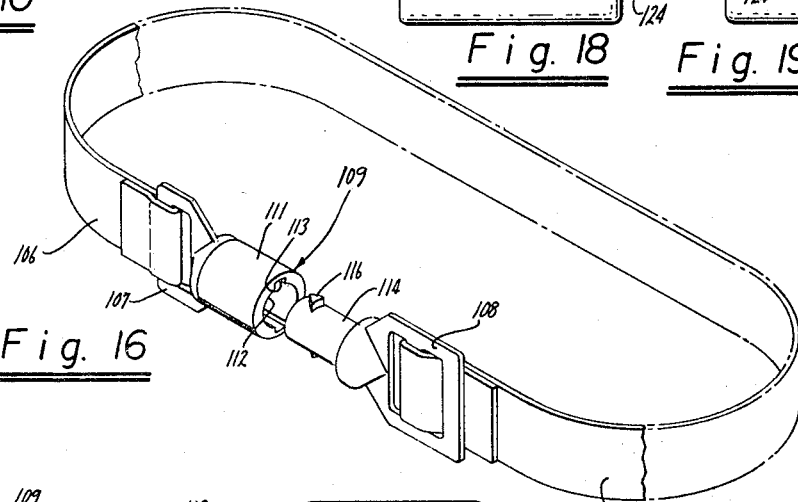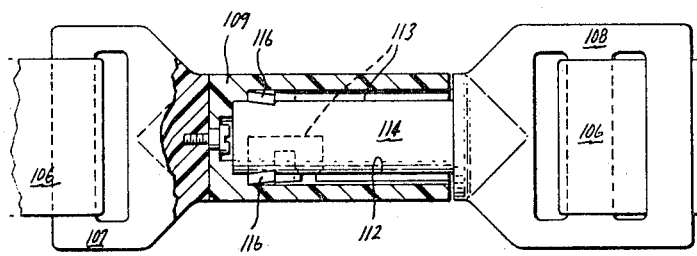

Jan. 21, 1969 H. G. SHAW 3,422,977
SAFETY DEVICE AND ASSEMBLY USING SAME
Filed March 17, 1967 Sheet 3 of 4
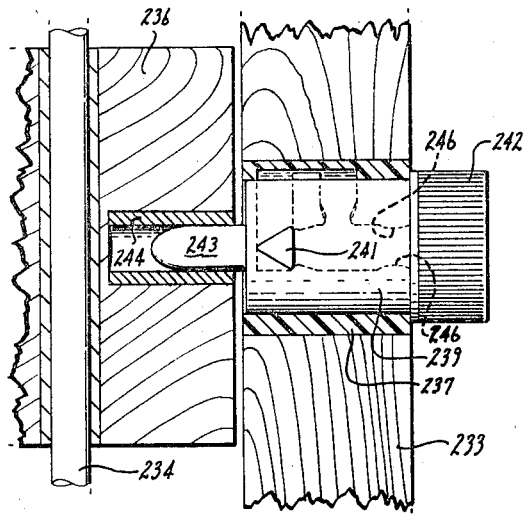
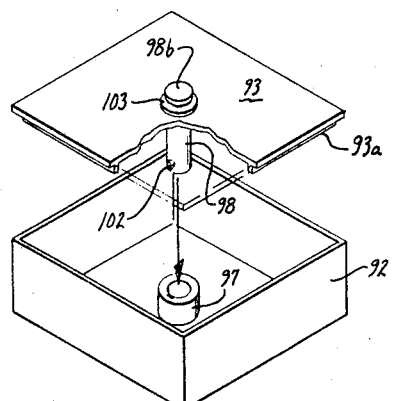
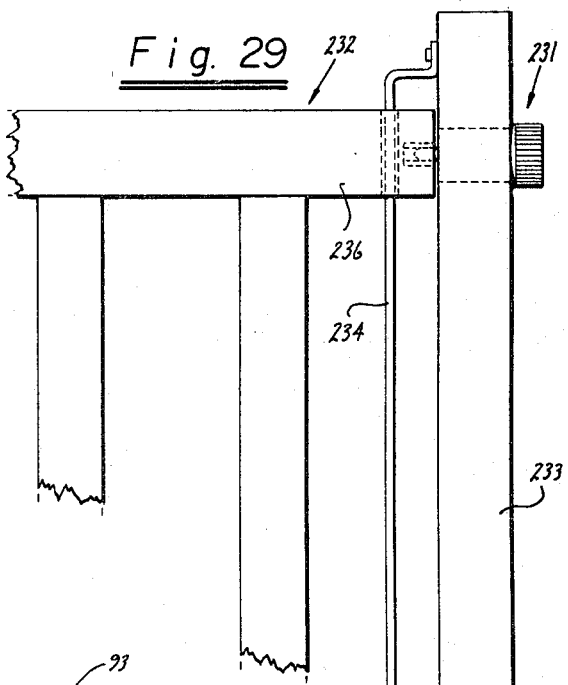
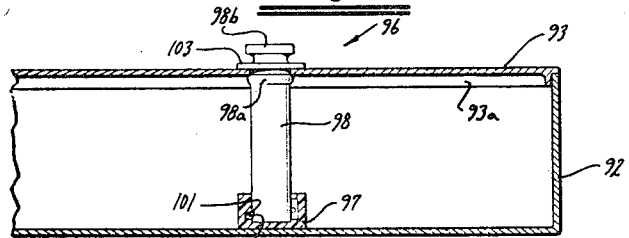
INVENTOR.
Howard G. Shaw
BY Flehr, Hohbach, Rest, Albritton & Herbert
Attorneys

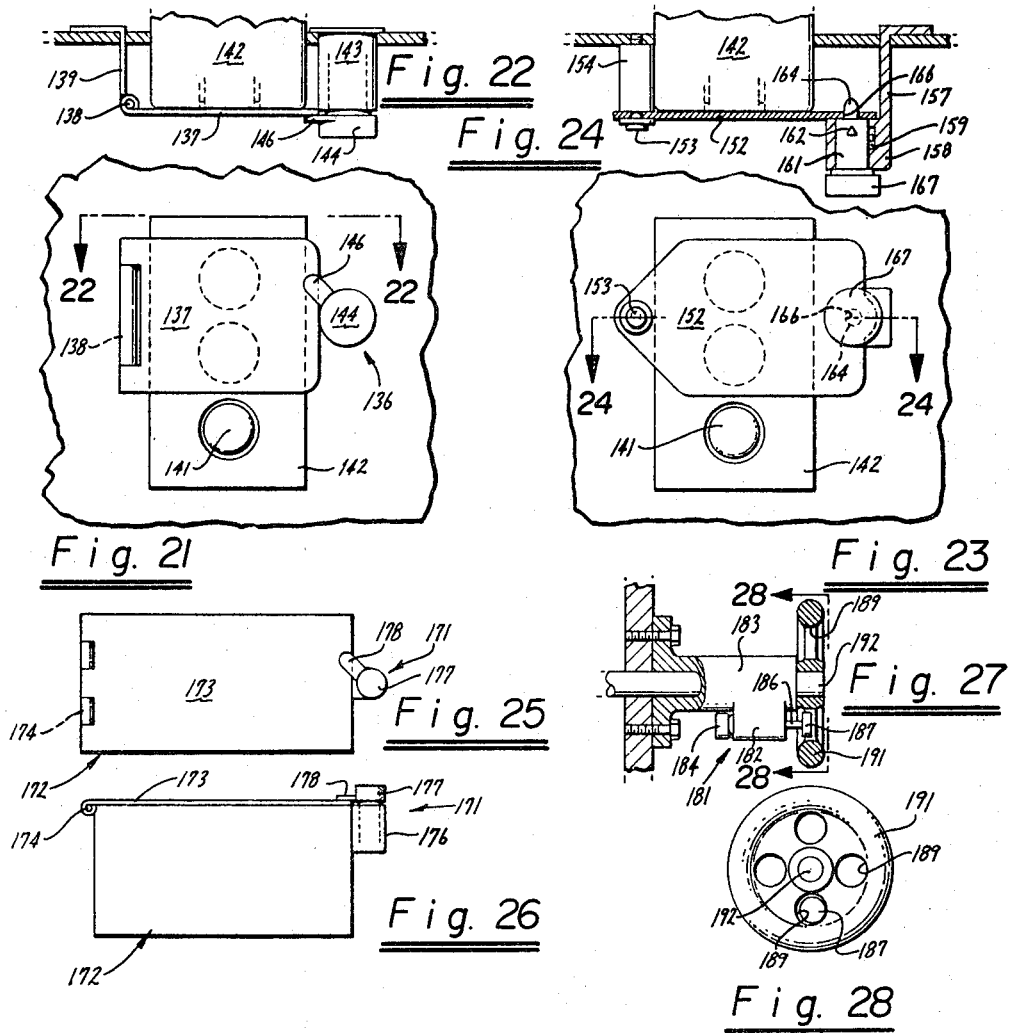

United States Patent Office 3,422,977
Patented Jan. 21, 1969

1

3,422,977
SAFETY DEVICE AND ASSEMBLY USING SAME
Howard G. Shaw, 24 Walnut Ave., Ross, Calif. 94957
Filed Mar. 17, 1967, Ser. No. 624,012
U.S. Cl. 215—9         20 Claims
Int. Cl. B65d 55/12

ABSTRACT OF THE DISCLOSURE

Safety device and assembly using same having female and male parts with a maze to prevent release by small children or thoughtless release by adults.

BACKGROUND OF THE INVENTION

This invention relates to a safety device and assembly using the same in which a maze is utilized.

Closures, couplings and fasteners have heretofore been provided which have been intended to provide safety for small children. However, such devices have been unsatisfactory for a number of reasons. For example, they have been too easily released by children and have had limited application. In addition, they often have been inconvenient for adults to use, fragile and obtrusive in appearance.

SUMMARY OF THE INVENTION

The safety device consists of a female part which has a cylindrical recess and a male part having a cylindrical protrusion which is insertable into the female part. Cooperative fastening means is carried by the female and male parts. The fastening means includes a groove forming a maze in one of said parts and a projection carried by the other of said parts and being of a size so that it can travel in said maze. The parts are rotatable with respect to each other. The groove opens through one end of the part incorporating it to permit the projection to enter the maze. The maze also includes means which permits the projection to travel therethrough in one direction but prevents travel in an opposite direction so that the parts must be moved relative to each other in more than one direction so that the manner for separating the parts is different from the manner in which the parts are coupled together.

The safety device can be utilized in a number of assemblies as, for example, a closure on vials, bottles, tubes and other containers; a coupling on belts and straps; and a fastener on containers, covers and various mechanical devices.

In general, it is an object of the invention to provide a safety device which is particularly adaptable for preventing children from gaining access to undesirable areas, or removing restraining devices.

Another object of the invention is to provide a safety device of the above character which can be readily utilized by adults, but which requires deliberate action by the adult.

Another object of the invention is to provide a safety device of the above character which does not require the use of a tool or other object to accomplish its release by an adult.

Another object of the invention is to provide a safety device of the above character which can have any desired degree of complexity for release.

Another object of the invention is to provide a safety device of the above character which can be readily incorporated in various types of assemblies.

Another object of the invention is to provide a safety device of the above character which is relatively simple and can be economically manufactured and used.

2

Additional objects and features of the invention will appear from the following description in which the preferred embodiments are set forth in conjunction with the accompanying drawings.

BRIEF DESCRIPTION OF THE DRAWINGS

FIGURE 1 is an isometric exploded view of a container in the form of a bottle and cap having cooperative fastening means incorporating the present invention.

FIGURE 2 is a top plan view of the bottle shown in FIGURE 1.

FIGURE 3 is a bottom plan view of the cap shown in FIGURE 1.

FIGURE 4 is a cross-sectional view taken along the line 4—4 of FIGURE 3.

FIGURE 5 is a view looking along the line 5—5 of FIGURE 2.

FIGURE 6 is a bottom plan view similar to FIGURE 3 but showing the projections carried by the inside of the cap.

FIGURE 7 is a cross-sectional view taken along the line 7—7 of FIGURE 6.

FIGURE 8 is a view of the cap taken along the line 8—8 of FIGURE 6.

FIGURE 9 is a view similar to FIGURE 5 but showing the mazes formed on the outside of the neck of the bottle.

FIGURE 10 is an isometric view of a container similar to that shown in FIGURE 1 with the maze, however, being formed inside the bottle and the projections carried by the outside of the cap.

FIGURE 11 is a partial view of the cap shown in FIGURE 10.

FIGURE 12 is a partial view of the bottle shown in FIGURE 10 and particularly shows a maze with a different complexity from that shown in FIGURE 4.

FIGURE 13 is an isometric view of a box-like container utilizing a fastener incorporating the present invention to hold the cover in place.

FIGURE 14 is a cross-sectional view taken along the line 14—14 of FIGURE 13.

FIGURE 15 is a view similar to FIGURE 13 but shows the cover removed.

FIGURE 16 is an isometric view of a belt utilizing a coupling incorporating the present invention.

FIGURE 17 is an enlarged cross-sectional view of the coupling shown in FIGURE 16.

FIGURE 18 is a front elevational view of a switch box in which a fastener incorporating the present invention is utilized for controlling the movement of the handle.

FIGURE 19 is a side elevational view of the switch box shown in FIGURE 18.

FIGURE 20 is a view showing one of the mazes utilized in the fastener for the switch box in FIGURES 18 and 19.

FIGURE 21 is a front elevational view of a control panel utilizing a fastener incorporating the present invention to hold a hinged cover in place.

FIGURE 22 is a top plan view taken along the line 22—22 of FIGURE 21.

FIGURE 23 shows a control panel utilizing a fastener incorporating the present invention to hold a pivoted cover in closed position.

FIGURE 24 is a cross-sectional view taken along the line 24—24 of FIGURE 23.

FIGURE 25 is a top plan view of a container utilizing a fastener incorporating the present invention to hold the hinged lid in closed position.

FIGURE 26 is a side elevational view of the container shown in FIGURE 25.

FIGURE 27 is a partial cross-sectional view of a portion of a hand-wheel operated device utilizing a fastener incorporating the present invention to prevent rotation.

FIGURE 28 is a view looking along the line 28—28 of FIGURE 27.

FIGURE 29 is a partial side elevational view of a baby crib utilizing a fastener incorporating the present invention.

FIGURE 30 is an enlarged cross-sectional view of the fastening device shown in FIGURE 29.

DESCRIPTION OF THE PREFERRED EMBODIMENTS

As shown in FIGURE 1 of the drawings, the safety device is incorporated in an assembly or unit in the form of a container. The container shown in FIGURE 1 consists of a bottle 51 and a cap 52. The bottle 51 can be formed of any suitable material such as plastic or glass with its neck having a generally cylindrical configuration as shown in the drawings. It is provided with a body portion 51a and a smaller cylindrical protrusion or protruding portion 51b which forms the neck of the bottle joined to the body portion 51a by a shoulder portion 51c. This cylindrical protrusion 51b, or the neck of the bottle, serves as a male part. The cap 52 is also formed of a suitable material such as plastic and has a substantially cylindrical configuration as shown in FIGURE 1. The cap is formed with a top wall portion 52a and a skirt portion 52b having a cylindrical recess 53 therein so that the cap 52 serves as a female part for receiving the male part or protrusion 51b.

Cooperative fastening means is carried by the female and male parts and consists of a maze 56 formed by a plurality of grooves as hereinafter described carried by one of the parts. The cooperative fastening means also includes at least one projection carried by the other part which is adapted to enter the maze and to form an interlocking or fastening relationship with the maze as the parts are engaged with respect to each other.

In the embodiment of the invention shown in FIGURE 1, two diametrically opopsed projections 57 are provided on outer surfaces of the protruding portion 51b and in the form shown are shaped as isosceles triangles with apexes extending in a vertical direction with respect to the bottle toward the upper end of the neck of the bottle with the legs of the triangles facing away from the neck of the bottle and forming a bottom portion which is wider than the uppermost portion of the projection. It should be readily apparent from the description of the invention that only one projection may be provided or, if desired, a greater number of projections may be provided.

As shown in FIGURES 3 and 4, the maze 56 is of a particular type and is formed by a groove 58 which opens through one end of the skirt 52b of the cap 52. The groove 58 extends in a generally vertical direction perpendicular to the top wall of the cap and narrows somewhat near the upper extremity thereof because of inwardly extending portions 59 provided in the cap. The groove 58 terminates in a groove 61 which extends in a horizontal direction which is generally perpendicular to the groove 58 and which is parallel to the top wall portion 52a of the cap 52. The groove 61 terminates in a small vertical groove 62 which is perpendicular to the top wall portion 52a of the cap 52. The groove 62 terminates in a horizontal groove 63 which is parallel to the groove 61 and terminates in another small vertical groove 64. The groove 64 terminates in a horizontal groove 66 in line with groove 61. Groove 66 terminates in a vertical groove 67, and groove 67 terminates in a horizontal groove 68 generally parallel to the bottom of the skirt portion 52b. An additional groove 69 is provided which is inclined with respect to the groove 61 and is in communication with the groove 61. As shown in FIGURE 4, the inclined portion 69 is inclined toward the top wall portion 52a of the cap 52 and extends to one side of the groove 58, whereas the groove 61 extends to the other side of the groove 58.

A plurality of resists of bumps 71 are provided in the maze 56 and are formed as an integral part of the cap 52. The resists 71 are in the form of raised and rounded surfaces extending across various portions of the maze 56. The surfaces of the resists 71 can be considered to form portions of a cylinder. As shown in FIGURE 4, the resists 71 can be disposed at any desired places in the maze. In FIGURE 4, one resist 71 is disposed adjacent the bottom of groove 58 in groove 61. Resists 71 are also positioned in groove 63, groove 67 and in groove 68. The resist in groove 68 is at the point where it termiantes in groove 58.

Use of the container shown in FIGURES 1 through 5 may now be briefly described as follows. Let it be assumed that the maze 56 has been formed in the skirt of the cap 52, or in other words, in the female part, whereas the projecting portions are carried by the neck 51b of the bottle 51, or in other words, the male part. If it is desired to close the container, relative movement is caused to occur between the cap 52 and the bottle 51 so that the grooves 58 of the maze 56 are in registration with the projections 57. Since the grooves 58 open downwardly through the skirt portion 52b, the grooves 58 can readily receive the apexes of the projections 57 so that the projections 57 will move upwardly into the grooves 58 until they encounter inwardly extending portions 59. The portions 59 and the projections 57 are formed in such a manner that the space between the portions 59 is slightly less than that of the widest width of the projections 57 so that it is necessary to utilize a slight pressure to cause the projections 57 to cam by the portions 59. This is possible because of the tapered shoulders provided on the projections 57. After the projections 57 have passed the inwardly extending portions 59, the cap is fastened or trapped in place so that it cannot be removed by reversing the direction in which the cap was inserted onto the bottle because the outer extremities of the projections 57 will engage the portions 59 to prevent the same from passing therebetween.

As hereinafter explained, the maze 56 is designed so that the container cannot be opened by small children or thoughtlessly opened by adults. If it is desired to accomplish a particularly tight seal for certain materials in the container, such as liquids or powders, the cap 52 is rotated in a clockwise direction as viewed in the top plan so that the projections 57 enter the grooves 69 to cause further pressure of the top wall 52a of the cap against the top of the neck 51b. In addition, a secondary seal could thus be formed between the lower extremity of the skirt 52b of the cap 52 and the shoulder portion 51c of the bottle.

If it is desired to remove the cap from the bottle, it is first necessary to rotate the cap 52 in a counterclockwise direction to move the projections 57 out of the grooves 69 and to cause the same to cam over the resists 71 and to enter the grooves 61. As soon as the projections 57 strike the end of the groove 61, the cap can be raised so that the projections 57 enter the groove 62. After the cap 52 has been raised, the cap can be rotated in a counterclockwise direction to cause the projections 57 to move in the grooves 63 and to cam over the resists 71 therein and to enter grooves 64. The cap thus must be lowered to cause the projections 57 to travel in grooves 64 and to enter grooves 66. The cap 52 must then be rotated in a counterclockwise direction so that the projections 57 travel in grooves 66 and enter grooves 67. Raising of the cap causes the projection 57 to move in grooves 67 over the resists 71 therein to enter grooves 68. The cap 52 must then be rotated in a clockwise direction to cause the projections 57 to move in the grooves 68 over the resists 71 at the end thereof into the grooves 58. The cap 52 can then be removed by raising it off of the projections 57. The resists or bumps 71 in the bottoms of the grooves resist casual movement of projections 57 in the grooves, but readily permit movement of the projections 57 over the same upon slight additional deliberate force being applied to male and female parts. Thus, the resists help to ensure that relatively precise deliberate movements in predetermined directions must be made before the cap 52 can be removed from the bottle 51.

With the arrangement of the maze 56 shown, it can be seen that the cap 52 must be moved in a specific pattern in order to permit removal of the cap from the bottle 51. By utilizing this cooperative fastening means and partially utilizing directions or rotation which are opposite from those conventionally used for removing caps from bottles, it is apparent that a safety closure has been provided which prevents thoughtless opening and which will prevent children below a certain age from mastering the maze and opening the bottle. For this reason, the bottle can be readily utilized for storing medicines and drugs which can either be in the form of tablets, capsules, liquids, ointments or powders. A similar bottle can also be utilized for storing poisonous household supplies such as insecticides, paints, disinfectants and the like. A similar container also can be utilized for storing dangerous articles such as screws, nails, needles, matches, etc. If desired, such a container can be utilized for preventing access to certain food articles as, for example, cookies, candy, etc. Thus, it can be seen that the safety closure serves many purposes.

The container can be made in various sizes and shapes to serve the desired purpose. In addition, the maze which is utilized can be arranged with the desired complexity. Additional mazes of differing complexity are set forth in conjunction with the embodiments described below.

In the embodiment of the invention shown in FIGURES 6 through 9, a cooperative fastening means similar to that shown on the embodiment in FIGURES 1 through 5 is utilized with the exception that three of the mazes 72 are formed in the exterior surface of the neck of the bottle spaced 120° apart and thus are carried by the male part, whereas three of the projections 73 are carried on the inside of the cap 52 spaced 120° apart. The mazes 72 are very similar to the mazes 56 hereinbefore described with the exception that they are of slightly different complexity and require opposite rotation sequence. Only a single offset is provided in the lower part of the maze in that the offset provided by groove 64 has been omitted and an offset is provided in the upper part of the maze by a groove 75. Inwardly extending portions 74 in the form of wedges have been provided in place of the bump-like inwardly extending portions 59 to form traps to cooperate with the projections 73 which are also in the form of wedges. The projections 73 and the portions 74 have inclined outer surfaces 76 and a retaining surface 77. At the point where groove 68 terminates in groove 58, a different type of resist is utilized in the form of a pair of inwardly extending bumps or portions 78.

When closing the bottle 51 with the cap 52, the wedge-shaped projections 73 enter the grooves 58 and with slight pressure are cammed over the wedge-shaped portions 74 so that a trap is formed in which the two surfaces 77 engage and prevent removal of the cap by merely lifting the cap. The bottle 51 can then be sealed by rotating the cap 52 in a counterclockwise direction so that the projections 73 enter the grooves 69. The bottle 51 can be opened by first rotating the cap 52 in a clockwise direction to move the projections 73 out of the grooves 69 over the resists 71 into groove 61. In sequence, the cap 52 is then lifted upwardly, rotated clockwise, lifted upwardly, rotated counterclockwise, pushed downwardly, rotated counterclockwise so that the projections 73 pass between the bumps 78 and then lifted upwardly out of grooves 58.

Another embodiment of the invention is shown in FIGURE 10 in which a maze 81 is formed on the inside wall of a bottle 82 which is substantially cylindrical along its entire length and which is not provided with a smaller neck portion. However, it is readily apparent that, if desired, the bottle 82 can be provided with a smaller neck portion, with a maze on the inside of the neck. A cap 83 is provided with a cylindrical portion 84 which has the triangular-shaped projections 57 formed thereon. The maze 81 is similar to the mazes shown in the embodiments disclosed in FIGURES 1 through 5 and FIGURES 6 through 9.

From the foregoing embodiments, it can be seen that mazes can be utilized either with a conventional rotation, i.e., counterclockwise, to begin opening, or the opposite, i.e., clockwise, to increase the complexity of the maze.

In the embodiments of the invention thus far described, the maze encompasses approximately 90° of rotation. However, it should be appreciated that either less or greater amounts of rotation can be incorporated in the maze, if desired.

The safety device can be utilized with other types of containers, as for example, as shown in FIGURES 13, 14 and 15. A fastener is utilized in conjunction with a covered box 91 which consists of a box-like receptacle 92 and a flat cover 93. As can be seen particularly in FIGURE 14, the cover 93 is provided with a depending edge portion 93a which is adapted to seat within the upper edge of the receptacle 92. The fastener 96 which is utilized in conjunction with the box consists of a female part 97 and a male part 98. The female part is provided with a cylindrical recess 99 and has formed therein a maze 101 of the type hereinbefore described. The male part 98 is in the form of a generally cylindrical member which is adapted to seat in the recess 99 in the female part 97 and carries a pair of projections 102 which are similar to the projections hereinbefore described. The male part is also provided with an enlarged shoulder portion 98a which seats against the lower surface of the cover 93. A washer 103 is secured to the male part 98 and engages the top side of the cover 93. The male part 98 is also provided with a knob-like portion 98b which is adapted to be grasped by the hand so that the male part can be inserted in or extracted from the maze 101 in the manner hereinbefore described with the previous embodiments.

The male part 98 can be rotated with respect to the cover and as soon as the male part has been extracted from the maze, the male part together with the cover 93 can be lifted off of the receptacle 92 in the manner shown in FIGURE 15. When it is desired to replace the cover, it is merely necessary to insert the projections 102 carried by the male part 98 into the maze 101 in the female part 97 and to thereby fasten the cover in place.

It should be appreciated that a container such as that shown in FIGURE 13 can be provided in any size or shape and can be utilized for any number of purposes as, for example, in storing articles which should be kept away from children.

The safety device can also be utilized as a coupling. For example, as shown in FIGURES 16 and 17, it can be utilized in conjunction with belts or straps. Such belts or straps can be utilized for holding a child in an auto seat, in a feeding table, or a stroller. They also can be utilized for fastening objects as, for example, a pair of cabinet doors or a stairway gate to prevent a child from entering a restricted area.

In a typical embodiment, the belt 106 is provided with buckle fittings 107 and 108 on opposite ends. A female part 109 is swivel mounted on the buckle fiting 107 so that it can be rotated. The female part 109 is provided with a cylindrical recess 112 and has a maze 113 of a type hereinbefore described formed therein. A male part 114 is secured to the other buckle fitting 108 and is formed as a cylindrical protrusion which is provided with projections 116 of a type hereinbefore described which are adapted to enter the maze 113 provided in the female part 109. It can be seen that the male part 114 can be readily inserted and fastened into the female part as hereinbefore described and released by rotating the female part 109 to permit the male part to escape from the maze. It should be appreciated that, if desired, the swivel can be provided in the male part 114 to permit rotation of the male part relative to the femal part.

The safety device can also be incorporated in fasteners in which projections or ears carried by the male prevent movement of a member. A typical application for such a fastener is shown in FIGURES 18, 19 and 20 in which a circuit breaker box 121 is shown and which includes an operating handle 122 which is in one position against an abutment 123 when the circuit breaker is closed, and is in another position against another abutment 124 carried by the box 121 when the circuit breaker is open. A fastener 126 is carried by the box and is mounted upon a plate 127 secured to the box. The fastener consists of a female part 128 which is mounted on the plate 127 and a male part 129. The female part 128 is provided with at least one maze 131 which is similar to the mazes hereinbefore described with the exception that it is provided with a small additional groove or recess 132 for a purpose hereinafter described. The male part 129 is provided with at least one projection of the type hereinbefore described. The male part, in addition, carries an ear 133 adjacent to the upper extremity thereof which is adapted to be moved into a position to prevent movement of the handle 122 as shown particularly in FIGURE 18. In addition, the male part 129 is provided with a knob 134 so that the male part can be rotated relative to the female part.

The annular length of the maze 131 is such that through all points of rotation in the maze, the ear 133 will still overlie the handle 122 to prevent moving the handle 122 from the position in which it is held by the fastener. It is only by moving the projections carried by the male part 129 into the groove or recess 132, so that it in effect overtravels the downwardly extending groove 58, that the ear 133 rotates far enough to the dotted line position shown in FIGURE 18 to clear the handle 122 to permit the handle 122 to be moved from the position in which it has been held by the fastener. This then makes it unnecessary to remove the male part from the female part to accomplish release of the handle 122.

The fastener 126 is of a type which can be used without removing the male member from the female member. Thus, there is provided a pair of inwardly projecting portions 135 which extend into the groove 58 of the maze 131 which, when engaged by the projections on the male member, inhibit removal of the male member. Therefore, the portions 135 prevent accidental removal of the male member from the female member.

It should be appreciated that, if desired, the fastener 126 can be mounted so as to hold the lever 122 in the open position against the abutment 124.

An additional use of the safety device is the fastener as shown in FIGURES 21 and 22 in which a fastener 136 engages a cover plate 137 hinged by a pin 138 to a support member 139. The cover plate 137, as shown, overlies two of three pushbuttons 141 of a control panel 142. The fastener is of the type described in conjunction with FIGURES 18, 19 and 20 and includes a female part 143 and a male part 144 which carries an ear 146. It can be seen that only by removing the male part 144 or by moving the projections carried by the male part 144 into the over-travel position in the maze, is it possible to open the hinged cover plate 137 to gain access to upper pushbuttons 141 in the panel 142.

In another similar embodiment shown in FIGURES 23 and 24, a fastener 151 is utilized to prevent swinging or pivoting movement of a cover plate 152 mounted for swinging movement on a screw 153 between a spacer 154 and a washer 156. The fastener 151 is carried by a support member 157. The fastener consists of a female member 158 which has a maze 159 formed therein, and a male member 161 which carries at least one projection 162 of the type hereinbefore described. The male member, in addition, carries a protrusion 164 which is concentric with the male member 161 and in axial alignment therewith but is of a slightly smaller diameter which extends through the female member and which is adapted to register with a hole 166 in the cover plate 152. The male member is also provided with a knob 167 to facilitate rotation of the male member.

In use, the male member can be retracted by withdrawal of the same from the female member in the manner hereinbefore described with the previous embodiments to remove the protrusion 164 from the hole 166 in the cover plate 152 to permit swinging movement of the cover plate and access to the pushbuttons 141 of the control panel 142 behind the cover plate 152. Similarly, the cover plate 152 can be fastened in place by moving the cover plate to the desired position and then inserting and engaging the male member 161 into the female member 158.

Still another use of the safety device is shown in FIGURES 25 and 26 in which a fastener 171 is utilized in conjunction with a container. The fastener is mounted on the side wall of a box-like receptacle 172 with a cover 173 hinged to the receptacle 172 by a pin 174. The fastener consists of a female member 176 which is mounted on the outside of the receptacle 172 and a male member 177 inserted in the female member 176 and which carries an ear 178 which overlies the cover 173 as shown particularly in FIGURE 25. Cooperative fastening means of the type hereinbefore described is carried by the male and female members. As hereinbefore described, the cover 173 can be opened when the male member 177 has been removed from the female, or rotated to the over-travel position, so that the ear 178 does not overlie the cover 173. It can readily be seen that the female can be mounted on the inside of the receptacle wall if so desired, with cover configuration adapted to it.

Still another use of the safety device is shown in FIGURES 27 and 28 in which a fastener 181 is provided to prevent rotation of parts relative to each other. The fastener consists of a female member 182 which is carried by support column 183, and a male member 184 which is provided with a protrusion 186 which extends through the female member 182 and carries a member 187 adapted to be moved into registration with one of the holes 189 carried by a hand wheel 191 mounted upon a shaft 192. The shaft 192 is rotatably mounted in the support column 183. The female member 182 and the male member 184 carry cooperative fastening means of the type hereinbefore described. It can be seen that by withdrawal of the male member 184 from the female member 183, it is possible to retract the member 187 to permit rotation of the wheel 191. Conversely, when the male member is in place as shown in the drawings, the member 187 prevents rotation of the hand wheel 191.

Another use of the fastener is shown in FIGURES 29 and 30 in which a fastener 231 is mounted on a baby crib 232. The baby crib 232 is of a conventional type and is provided with corner posts 233 which have guide rods 234 secured thereto. The crib is provided with a crib side 236 which is movable vertically on the guide rods 234 between an upper or closed position and a lowered or open position. The fastener 231 is provided for retaining the crib side 236 in a raised position. The fastener 231 consists of a female part 237 which carries a maze 238 of a type hereinbefore described and a male part 239 which is disposed in the female part and carries projections 241 of the type hereinbefore described adapted to travel within the maze 238. The male part is provided with a knob 242 for rotating the male part in the maze. The male part also carries a protrusion 243 which is adapted to enter into a sleeve 244 carried by the crib side 236.

It can be seen that when the protrusion 243 is disposed in the sleeve 244, the crib side 236 cannot be lowered. It is only when the male part 239 has been disengaged from the female part 237 and the protrusion 243 withdrawn from the sleeve 244 that it is possible to lower the crib side. In this way, it can be seen that the crib side cannot be inadvertently lowered nor can it be lowered by a small child. Inwardly projecting portions 246 are provided in the maze to prevent accidental removal of the male part 239 from the female part.

From the foregoing description, it can be seen that the safety device can be utilized in a great number of ways—as a closure, as a coupling and as a fastener. The safety device is also one which is relatively simple to manufacture and which can be readily incorporated in a great number of assemblies. From all of the embodiments, it can be seen that engagement of the male and female members is accomplished by a single movement in only one direction of one member relative to the other which results in entrapment of one member in the other. For disengagement, rotational and axial movement of the members relative to each other in a predetermined sequence is required to effect release of the members.

I claim:

1. In a safety device, a female part having a cylindrical recess, a male part having a cylindrical conformation insertable into the female part, cooperative fastening means carried by the female and male parts, said cooperative fastening means including a maze formed by groove-like tracks in one of said parts, and at least one projection carried by the other of said parts and being of a size so that it can travel in said maze as said parts are shifted with respect to each other, said maze having one groove-like track which opens through one end of the part in which it is located through which the projection must enter and leave the maze, said maze also including trap means located at the innermost end of said one groove-like track, said trap means being engageable as the parts are fastened together by movement through the path defined by said one groove-like track and preventing separation of the parts by movement through the same path so that the parts must be shifted relative to each other to move the projection through a different predetermined path in the maze and then into said groove-like track when the parts are being separated.

2. A safety device as in claim 1 wherein the maze includes an extension which permits over-travel of the projection in the maze.

3. A safety device as in claim 1 wherein the maze is formed with an additional groove-like track which is inclined slightly from a line which is perpendicular to the axis of rotation of the parts for fastening the parts together and which can be engaged by the projection which travels through the maze as the parts are fastened together so that the projection enters the additional groove-like track there occurs gradual axial movement of the parts relative to each other.

4. A safety device as in claim 1 together with portions extending into the groove at spaced points to resist movement of the projection over said portions.

5. A safety device as in claim 1 wherein the male member is formed with a protrusion which is in axial alignment with the female part and extends through the female part.

6. A safety device as in claim 1 wherein the male part carries an ear which is outside of the female part and extends generally in a direction which is at right angles to the axes of movement for insertion of the male part within the female part.

7. A safety device as in claim 1 wherein said trap means is formed by at least one raised portion extending into the groove-like tracks and wherein said projection is formed to travel over said raised portion in one direction but is prevented from travelling over said raised portion in an opposite direction.

8. In a container, an open-ended receptacle having a cylindrical neck portion and a cap for closing said open-ended receptacle, said neck portion and said cap forming first and second parts, cooperative fastening means carried by the first and second parts, said fastening means including a maze formed by at least one groove in one of said parts, and at least one projection carried by the other of said parts and being of a size so that it can travel in the maze of the first named parts as the parts are moved with respect to each other, said maze being formed to include means permitting said projection to travel through the maze along a predetermined path when the parts are fastened together, but preventing travel along said path when separating the parts so that the parts must be shifted to move the projection through a different path in the maze when separating the parts, said maze including a portion at the end of the maze which is inclined slightly in a direction away from a line perpendicular to the axis of rotation of said parts as they are fastened together, said projection being movable in said portion of said maze to cause gradual axial movement of said parts relating to each other to form a seal between the outer extremity of the neck portion and the inner extremity of the cap.

9. In an assembly of the character described, a first member, a second member movable with respect to said first member, a fastener for preventing movement of said second member with respect to said first member, said fastener consisting of a female part having a cylindrical recess, a male part having a cylindrical conformation adapted to be inserted into the female part, cooperative fastening means carried by the female and male parts, said fastening means including at least one maze formed by at least one groove in one of said parts and at least one projection carried by the other of said parts and being of a size so that it can travel in said maze as said parts are moved with respect to each other, the groove forming said maze opening through one end of the part to permit the projection to enter the maze, said maze also including means permitting said projection to travel therethrough along one path in the maze when fastening the parts together but preventing travel in said one path when separating the parts so that the parts must be moved relative to each other in a specific pattern to cause the projection to travel in a different path before the parts can be separated from each other, and means carried by the male part for preventing movement of said second member with respect to said first member beyond a predetermined position.

10. An assembly as in claim 9 wherein said means carried by the male part for preventing movement is in the form of a protrusion which extends axially of the male part.

11. An assembly as in claim 9 wherein the means carried by the male part is in the form of an ear which extends from the male part in a direction which is substantially at right angles to the axis of the male part.

12. An assembly as in claim 9 wherein said first and second members are slidable with respect to each other and wherein said female part is mounted in one of said members and wherein the protrusion carried by the male member is adapted to extend into the path of movement of the other member.

13. An assembly as in claim 9 wherein said first and second members are rotatable with respect to each other and in which the female part is carried by one of the members and the male part is movable to a position to prevent rotation of the other member with respect to the first member.

14. In a safety device, a female part having a cylindrical recess, a male part having a cylindrical confirmation insertable into the female, cooperative fastening means carried by the female and male parts, said cooperative fastening means including a maze formed by groove-like tracks in one of said parts, and at least one projection carried by the other of said parts and being of a size so that it can travel in the said maze as said parts are shifted with respect to each other, said maze having one groove-like track which opens in a direction toward the one end of the part in which it is located and through which the projection must enter and leave the maze, said maze also including trap means located at the other end of said one groove-like track which opens in a direction toward one end of the part in which it is located, said trap means being engageable as the parts are fastened together by movement through a predetermined path defined by said one groove-like track but preventing separation of the parts by moving through the same predetermined path in said one groove-like track and making it necessary that the parts be shifted relative to each other to remove the projection through a different predetermined path in the maze and then into the groove-like track which opens in a direction toward one end of the part in which it is located when the parts are being separated.

15. In a container, an open-ended receptacle having a cylindrical neck portion and a cap for closing said open-ended receptacle, said neck portion and said cap forming first and second parts, cooperative fastening means carried by the first and second parts, said fastening means including a maze formed by groove-like tracts in one of said parts, at least one projection carried by the other of said parts and being of a size so that it can travel in the groove-like tracks of the maze of the first named part as the parts are moved with respect to each other, said maze having one groove-like track opening in a direction through one end of the part in which it is located to permit the projection to enter and leave the maze, said maze being formed to include means engageable when the parts are fastened together by movement through the path defined by said one groove-like track and preventing separation of the parts by movement through the same path in said one groove-like track whereby said projection must be shifted through the maze in a different predetermined path to separate the two parts.

16. A container as in claim 15 wherein said means engageable when the parts are fastened together consists of trap means disposed at one end of said one groove-like track.

17. A container as in claim 15 wherein said one groove-like track is substantially straight whereby said parts can be fastened together by moving the two parts towards each other in a straight line.

18. A container as in claim 15 wherein said maze is constructed so that the parts must be rotated relative to each other before they can be separated.

19. A container as in claim 15 wherein said maze is formed with an additional groove-like track which is inclined slightly from a line perpendicular to the direction of movement of the parts when the parts are fastened together, said additional groove-like track being engageable by the projection as the parts are fastened together so that as the projection enters the additional groove-like track, there occurs gradual axial movement of the parts with respect to each other to cause a sealing relationship to be established between the upper extremity of the neck portion and the inner extremity of the cap.

20. A container as in claim 15 wherein said maze is provided with raised portions within the groove-like tracks in predetermined locations to resist movement of the two parts relative to each other at said predetermined locations.

References Cited

UNITED STATES PATENTS

| | | | |
|---|---|---|---|
| 1,089,887 | 3/1914 | Waye | 215—9 |
| 1,279,223 | 9/1918 | Barry | 215—50 |
| 1,423,592 | 7/1922 | Baldwin | 215—50 |
| 2,960,247 | 11/1960 | Christie | 215—9 |
| 3,212,662 | 10/1965 | Webb | 215—9 |
| 3,219,220 | 11/1965 | Hakim | 215—9 |

FOREIGN PATENTS 449,295    2/1913    France.

WILLIAM T. DIXON, JR., *Primary Examiner.*

U.S. Cl. X.R.

220—40; 215—44; 24—207